May 5, 1942.   J. E. JONES   2,281,844
DISTANT CONTROL APPARATUS
Filed Oct. 7, 1940
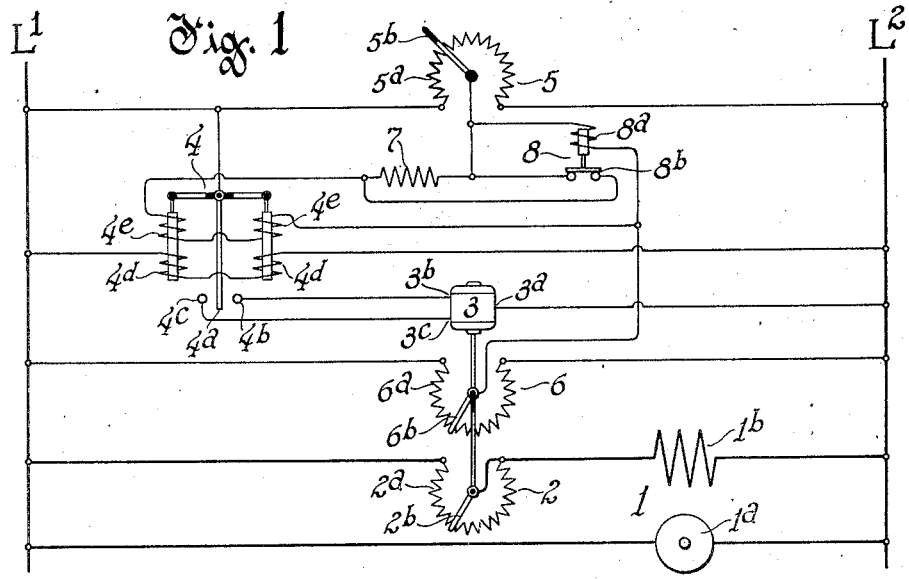
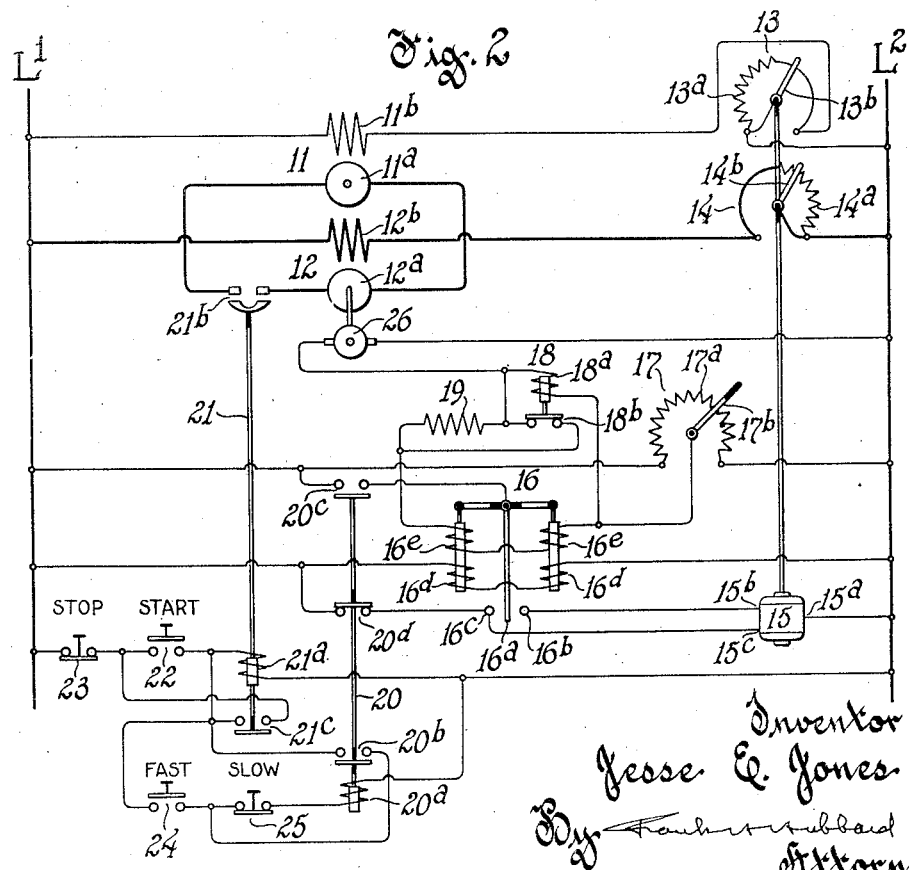
Inventor
Jesse E. Jones Patented May 5, 1942

2,281,844

UNITED STATES PATENT OFFICE 2,281,844

DISTANT CONTROL APPARATUS

Jesse E. Jones, Wauwatosa, Wis., assignor to Cutler-Hammer, Inc., Milwaukee, Wis., a corporation of Delaware Application October 7, 1940, Serial No. 360,036

4 Claims. (Cl. 172—239)

This invention relates to distant control apparatus and while not limited thereto is particularly applicable to the control and the presetting of the speed of motors or the voltage of generators from a distance.

In the past, controllers of the aforementioned type were usually provided with motor operated control rheostats for controlling the operating conditions of a dynamo electric machine and the driving motors for such rheostats were in turn operated by a follow-up system comprising a sender potentiometer and a receiver potentiometer. However, these systems did not prove entirely successful because the relay which responded to the current between the sending and the receiving potentiometers and which in turn controlled the drive motor for the control instrumentalities proper of the dynamo electric machine had to be designed to withstand the current corresponding to the greatest difference between the sender and the receiver potentiometer and when so designed was not sufficiently sensitive to cause response for very small differences in potential. As a result the apparatus was not sufficiently sensitive to meet commercial requirements and gave rise to over-travel or hunting, and it is an object of the present invention to overcome the aforementioned difficulties.

Another object of the invention is to provide distant control apparatus of the aforementioned type in which the sensitivity of a relay to the actuating current is varied in accordance with the voltage available for the operation of such relay.

Another object is to maintain the speed of a motor from a distance at any desired preselected value.

Another object is to provide a controller for starting a motor from rest to operate at a minimum speed and accelerating or decelerating said motor to or from a higher speed selectively.

Another object is to provide a controller which will automatically maintain the speed of a motor at a given preselected value.

Other objects and advantages will hereinafter appear.

The accompanying drawing is illustrative of two embodiments of the invention, but it will be understood that many modifications thereof, all coming within the scope of the present invention may be made.

In the drawing, Figure 1 illustrates a system wherein a shunt wound motor may be supplied with power from a constant voltage direct current source and is controlled from a distance by an adjustable potentiometer, while Fig. 2 shows another system of a separately excited motor whose armature is supplied from a motor generator, while the field of the generator as well as that of the motor may be supplied with power from a constant voltage direct current source.

Referring to Fig. 1, the same illustrates a system incorporating the invention in which a shunt wound direct current motor has its speed distantly controlled by a separate speed-setting device. The system is supplied with power from the supply lines $L^1$ and $L^2$ of a constant potential direct current source. A motor 1 whose speed is to be controlled has its armature $1^a$ connected across the bus bars $L^1 L^2$, while its shunt field winding $1^b$ is connected across the same bus bars in series with a field rheostat 2, the latter comprising a variable resistor $2^a$ which may be varied by a rotatable contact lever $2^b$. The lever $2^b$ is coupled by suitable means to a reversible pilot motor 3, having a common terminal $3^a$ connected to the line $L^2$, while its reversing terminals $3^b$ and $3^c$ are connected to stationary contacts $4^b$ and $4^c$, respectively, of a center biased relay 4. The armature $4^a$ of relay 4 is connected to the line $L^1$ and is adapted to selectively complete a circuit with contacts $4^b$ and $4^c$, respectively, when it is deflected from its center position in one or the other direction. The relay 4 is provided with center biasing means (not shown) and with a pair of balancing windings $4^d$ connected across $L^1$ and $L^2$ and adapted to exert equal and opposite pulls upon the element $4^a$ of the relay, and with a pair of operating windings $4^e$, cooperating with the respective windings $4^d$ as will be hereinafter explained.

The system further includes a manually operable speed setting potentiometer 5, having a resistor $5^a$ which is connected across the bus bars $L^1$ and $L^2$ and a manually operable contact lever $5^b$, by means of which a variable potential may be obtained. A second potentiometer 6 is operatively connected with the rheostat 2 in such a manner, that the position of its movable contact lever $6^b$ corresponds at all times to the position of the lever $2^b$ and thus to the current in the shunt field and thus to the speed of the motor 1. The resistor $6^a$ of the potentiometer 6 is connected across the lines $L^1$ and $L^2$.

The operating coils $4^e$ are connected between the contact levers $5^b$ and $6^b$, in series with a resistor 7. Hence if a potential difference exists between the contacts $5^b$ and $6^b$ a current flows in one or the other direction through the coils 4ᵉ to deflect the relay armature in the corresponding direction to thereby energize the motor 3 in a corresponding sense. As a result the motor 3 causes the rheostat arm 2ᵇ to revolve to change the field current and thus the speed of the motor 1 until the position of the lever 6ᵇ again corresponds to the position of lever 5ᵇ, whereupon the armature 4ª returns to its neutral position and deenergizes the pilot motor 3 to stop further change of the rheostat 2.

The relay 4 is, if constructed to withstand the maximum current, relatively insensitive in responding to small potential differences impressed upon the coils 4ᵉ, and its action is therefore relatively sluggish for the corresponding low energization, because it has to overcome the centering force acting on the armature. To overcome this objection, a single pole relay 8 capable of withstanding high currents, but with high sensitivity is connected in circuit between the levers 5ᵇ and 6ᵇ. The relay is provided with an energizing winding 8ª and normally closed contacts 8ᵇ which latter are connected to short circuit the resistor 7. Thus, when the current flowing between the rheostats 5 and 6 is low, the resistor 7 is short circuited to afford a maximum energization of the coils 4ᵉ and thus response of the relay 4, while when said current is high, the resistor 7 is inserted in series with the coils 4ᵉ to protect the same against too high a current. As a result of this arrangement the relay 4 may be made much more sensitive to low currents without being overloaded by higher currents than would otherwise be possible.

The system illustrated in Fig. 1 functions as follows: If it is desired to operate the motor 1, which may have been started in any suitable manner, at a given speed the contact arm 5ᵇ of the potentiometer 5 is moved to a position corresponding to the desired speed. If thereupon the potentiometer arm 6ᵇ of the potentiometer 6 is not in a corresponding position, a potential difference exists between the contact arms 5ᵇ and 6ᵇ and a current flows therebetween, the direction of which depends upon the relative potential of the two potentiometer arms. As a result a current flows between the contact arm 5ᵇ through contact 8ᵇ, coils 4ᵉ of relay 4 to contact arm 6ᵇ. This current unbalances the relay 4, the balancing coils 4ᵈ of which are connected across the lines L¹ and L² and the relay armature completes a circuit through contacts 4ᵇ or 4ᶜ, thereby energizing the motor 3 to rotate in one direction or the other to change the position of the contact arm 6ᵇ and also of the contact arm 2ᵇ. The latter varies the potential impressed upon the field winding 1ᵇ, thereby changing the speed of motor 1 until the position of the contact arm 6ᵇ corresponds to that of contact arm 5ᵇ at which time relay 4 returns the armature 4ª to its neutral position. The motor 3 is thereupon deenergized so that no further change is made in the excitation of motor 1 and the motor continues to operate at the desired speed.

As aforementioned, if the potential difference between the arm 5ᵇ and 6ᵇ should be very great an excessive current would flow through the coils 4ᵉ, and this would either require the coils to be designed to withstand this high current, resulting in a very low sensitivity of relay 4, or a lower accuracy of control, that is, of correspondence between the speed of motor 1 and the position of the contact arm 5ᵇ must be permissible. However, both of these alternatives may be avoided and the relay 4 may be made very sensitive or in other words allowing for only small departures of the actual speed of the motor 1 from the desired speed by connecting relay 8 between the contact arms 5ᵇ and 6ᵇ in parallel with the relay 4. The relay 8 may be made very sensitive as it is only required to operate a normally closed contact which carries a very small current, while the voltage impressed on its energizing coil is yet sufficiently high to insert resistor 7 in series with the coils 4ᵉ to protect the relay 4 from high currents. Thus if the contact arm 5ᵇ is moved suddenly from a given position to another position a large current temporarily flows partly through the energizing winding 8ª and partly through the winding 4ᵉ causing the relay 8 to insert the protecting resistance 7. However, in spite of the reduction by resistor 7 the current through the coil 4ᵉ is still sufficient to cause deflection of the relay 4 to energize the motor 3. As the motor 3 thereafter varies the resistance of rheostats 6 and 2 and the motor speed approaches the desired value, the current in the winding 8ª becomes sufficiently low to cause the relay 8 to close its contacts 8ᵇ and thereby short circuit the resistor 7 and to strengthen the winding 4ᵉ. Thus the motor 3 remains energized until the departure of the speed of motor 1 from the desired value is very small, whereupon the relay armature 4ª opens the circuit of motor 3 and the motor 1 continues to operate at the new desired speed.

Referring to Fig. 2 the same illustrates a system comprising a variable voltage generator 11 having an armature 11ª and an exciting winding 11ᵇ. The armature 11ª is connected in a closed circuit with an armature 12ª of a motor 12 the speed of which is to be controlled, said motor 12 having an exciting winding 12ᵇ. The exciting windings 11ᵇ and 12ᵇ are connected in series with field regulators 13 and 14, respectively, across the supply lines L¹ and L² which supply power for the system. The generator armature 11ª is driven at a constant speed by a suitable prime mover, not shown.

The rheostats 13 and 14 are provided with variable resistors 13ª and 14ª respectively, the value of which can be adjusted by means of the contact arms 13ᵇ and 14ᵇ respectively. The rheostats and their contact arms are arranged in such a manner that no change is made in the value of the resistor 13ª while the resistor 14ª is being varied and vice versa, the two contact arms being connected together by a shaft which is driven by a reversible motor 15, said motor having a common terminal 15ª connected to line L² and forward and reverse terminals 15ᵇ and 15ᶜ respectively, connected to stationary terminals 16ᵇ and 16ᶜ, respectively, of a center biased relay 16. Relay 16 has an armature 16ª arranged to complete the circuit with stationary contacts 16ᵇ and 16ᶜ, respectively, when deflected in one direction or the other, while normally the armature is biased to its center position. Relay 16 is also provided with balancing windings 16ᵈ connected across the lines L¹ and L² to exert opposed torques on the relay, and with reversing windings 16ᵉ, the connection of which will be explained hereinafter.

The system further comprises a potentiometer rheostat 17 having a variable resistor 17ª, connected across the lines L¹ and L² and a contact lever 17ᵇ for varying the value of the resistor. Coupled to the shaft of the motor 12 is a tachometer generator 26, one terminal of which is connected to the line L² while its other terminal is connected through an energizing winding 18ᵃ of a relay 18 to the contact arm 17ᵇ. The relay 18 is provided with normally closed contacts 18ᵇ, and a circuit is provided from the commutator 26 through the normally closed contacts 18ᵇ and winding 18ᵃ to line L². The contacts 18ᵇ are arranged to short circuit a resistor 19.

There is also provided a relay 20 having an energizing winding 20ᵃ, normally open contacts 20ᵇ and 20ᶜ and normally closed contacts 20ᵈ. An electromagnetic main switch 21, having an energizing winding 21ᵃ is provided with normally open main contacts 21ᵇ which are adapted, when closed, to connect the armatures 11ᵃ and 12ᵃ in series. Switch 21 is also provided with normally open auxiliary contacts 21ᶜ. The energizing coil 21ᵃ has one of its terminals connected to the line L², while its other terminal is connected through a normally open start push button switch 22 and a normally closed stop push buttom 23 to line L¹. The normally open contacts 21ᶜ are arranged in parallel with the start push buttom switch 22. A further circuit extends from line L² through energizing coil 20ᵃ, a normally closed "slow" push buttom switch 25 and a normally open "fast" push buttom switch 24, through push buttom switches 22 and 23 to line L¹, while normally open contacts 20ᵇ are arranged in parallel with the push button switch 24.

The tachometer generator 26 is coupled to the motor armature 12ᵃ to rotate therewith so that its output voltage is a direct function of the speed of the motor 12. One terminal of the generator 26 is connected to line L², while the other terminal is connected through the windings 16ᵉ to the contact arm 17ᵇ.

The system illustrated in Fig. 2 functions as follows: If it is desired to start the equipment the prime mover driving the generator 11 is started to operate the latter at the required speed and the lines L¹ and L² are energized to supply the control and exciting current for the system. When the lines L¹ and L² are energized current flows through the windings 16ᵈ of relay 16 and a circuit is also completed from line L¹ through contact 20ᵈ to the terminal 15ᶜ of motor 15, through the motor 15 to line L². This causes the motor 15 to rotate in a counterclockwise direction so as to insert all of the resistance 13ᵃ in series with the shunt field winding 11ᵇ and to short circuit the resistor 14ᵃ to connect the shunt field winding 12ᵇ across the lines L¹ and L². If now the operator pushes the starting buttom 22 the main switch 21 is energized closing contact 21ᶜ so as to short circuit the push buttom 22 to maintain the switch 21 energized upon release of said button and also closing contacts 21ᵇ which connects the armatures 11ᵃ and 12ᵃ in series. The generator 11 generates a low electromotive force for starting the motor 12 which thereupon rotates with full field excitation and at its lowest speed. Rotation of the motor armature 12ᵃ also rotates the tachometer 26 which generates a voltage proportional to the speed of the motor 12. By thereafter pushing the push button 24 the relay 20 is energized, thereby opening the circuit to the terminal 15ᶜ of the motor 15, while at the same time a circuit from line L¹ to the armature 16ᵃ of relay 16 is completed through contact 20ᶜ so that if there is a potential difference between the tachometer 26 and the position of the lever 17ᵇ current flows through the coils 16ᵉ which causes relay 16 to energize the motor 15 to rotate in a clockwise direction to strengthen the generator field winding 11ᵇ and increase the electromotive force which is impressed on the armature 12ᵃ of motor 12 and if desired to thereafter weaken the excitation of said motor to speed up the latter. After the balance has been established the armature 16ᵃ again returns to its center position and the motor 15 is deenergized so that the motor 12 continues to rotate at the desired speed. If it is desired to decrease the speed of the motor 12ᵃ the contact lever 17ᵇ may be moved to a corresponding position whereupon the current in the windings 16ᵉ energizes the relay 16 to close the circuit to terminal 15ᵇ of the motor 15. This causes the latter to rotate counterclockwise and thereby to strengthen the field 12ᵇ and/or weaken the generator field 11ᵃ to slow down the motor 12.

It will be noted that the motor 15 may also be rotated to decrease the speed of motor 11 by depressing the button 25 or until the generator excitation reaches its lowest value.

Pushing of the stop button 23 deenergizes the main switch 21 and this in turn deenergizes the relay 20 so as to energize the motor 15 to increase the excitation of motor 12 and to thereafter reduce the excitation of the generator 11 to its lowest value while at the same time opening up contacts 21ᵇ to disconnect the motor 12 from the generator 11.

It will be obvious that the function of the relay 18 with respect to the relay 16 is similar to that of the relay 8 with respect to relay 4 as explained in connection with Fig. 1.

It should also be pointed out that the system shown in Fig. 2 is so arranged that an increase in speed range of motor 12 may be obtained by weakening the excitation of the motor field 12 through the insertion of resistor 14 in series therewith, after full field strength has been attained of the generator field 11ᵇ by the short circuiting of all of the resistor 13ᵃ.

While the system described shows the speed regulation of direct current motors, it will be obvious that the invention may also be applied to the voltage regulation of generators and that it may further be applied to alternating as well as to direct current and electric machines.

What I claim as new and desire to secure by Letters Patent is:

1. A system for regulating an operating condition of a device, comprising the combination with a sender source having an adjustable output voltage, of a receiver source adapted to supply a voltage which varies with an operating condition of the device to be regulated, a center biased relay having a pair of biasing windings energizable at a constant voltage and affording opposing torques on a control element of said relay and with a pair of control windings connected in circuit to respond to the potential difference between said sender and said receiver voltages, one each of said control windings being inductively related to one each of said biasing windings to produce opposite effects upon the latter, the control element of said relay being adapted to control said operating condition of said device in response to said potential difference, and a voltage relay connected to respond to said potential difference, said voltage relay including means affording different degrees of response of said center biased relay to said potential difference for potential differences above and below a given value, respectively.

2. A system for regulating an operating condition of a dynamo electric machine, comprising the combination wth a sender source having an adjustable output voltage, of a receiver source adapted to supply a voltage which varies with an operating condition of a dynamo electric machine to be regulated, a center biased relay having a pair of biasing windings energizable at a constant voltage and affording opposing torques on a control element of said relay and with a pair of control windings connected in circuit to respond to the potential difference between said sender and said receiver voltages, one each of said control windings being inductively related to one each of said biasing windings to produce opposite effects upon the latter, the control element of said relay being adapted to control an operating condition of said dynamo electric machine in response to said potential difference, and a voltage relay connected to respond to said potential difference, said voltage relay including means affording different degrees of response of said center biased relay to said potential difference for potential differences above and below a given value, respectively.

3. A system for regulating an operating condition of a dynamo electric machine, comprising the combination with a sender source having an adjustable output voltage, of a receiver source adapted to supply a voltage which varies with an operating condition of a dynamo electric machine to be regulated, a center biased relay having a pair of biasing windings energizable at a constant voltage and affording opposing torques on a control element of said relay and with a pair of control windings connected in circuit to respond to the potential difference between said sender and said receiver voltages, one each of said control windings being inductively related to one each of said biasing windings to produce opposite effects upon the relay, the control element of said relay being adapted to control an operating condition of said dynamo electric machine in response to said potential difference, an impedance in series with said control wnding, and a voltage relay connected to respond to said potential difference and provided with normally closed contacts adapted to insert said impedance when said difference exceeds a given value, to thereby modify the degree of response of said center biased relay to said potential difference.

4. A system for regulating the speed of an electric motor, comprising the combination of an electric motor and a generator each having an armature and a field winding, an electromagnetic switch to connect said armatures into a closed loop, a motor field regulator and a generator field regulator connected in series with the respective field windings, electromagnetic reversing means coupled to said field regulators and adapted to vary their respective resistance, a tachometer generator coupled to said motor armature and adapted to supply a voltage which is a function of the speed thereof, a sender potentiometer affording an adjustable output voltage, a center biased relay connected in circuit with said tachometer and said sender potentiometer to respond to the potential difference between their respective output voltages and affording control of said electromagnetic reversing means, and means including an electromagnetic relay to energize said electromagnetic switch and to affect said electromagnetic reversing means to provide maximum energization of said motor field and minimum energization of said generator field for starting said motor, and selectively to subject said electromagnetic means to the control by said center biased relay to thereby vary the excitation of said generator and of said motor in accordance with the potential difference between said tachometer and said sender potentiometer and to operate said motor at a speed corresponding to the adjustment of said sender potentiometer.

JESSE E. JONES.